(12) United States Patent
Beskrovny (10) Patent No.: US 10,878,129 B2
(45) Date of Patent: Dec. 29, 2020

(54) CLASSIFICATION OF GUI ITEMS ACCORDING TO EXPOSURE TO SECURITY SENSITIVE OPERATIONS

(71) Applicant: CyberArk Software Ltd., Petach-Tikva (IL)

(72) Inventor: Evgeny Beskrovny, Ramat Gan (IL)

(73) Assignee: CyberArk Software Ltd., Petach-Tikva (IL)

(*) Notice: Subject to any disclaimer, the term of this patent is extended or adjusted under 35 U.S.C. 154(b) by 248 days.

(21) Appl. No.: 15/966,872

(22) Filed: Apr. 30, 2018

(65) Prior Publication Data

US 2019/0332788 A1    Oct. 31, 2019

(51) Int. Cl.
*G06F 21/62*    (2013.01)
*G06F 9/54*    (2006.01)

(52) U.S. Cl.
CPC ............ *G06F 21/629* (2013.01); *G06F 9/543* (2013.01); *G06F 21/6218* (2013.01)

(58) Field of Classification Search
CPC .... G06F 21/629; G06F 21/6218; G06F 9/543; G06F 21/577
See application file for complete search history.

(56) References Cited

U.S. PATENT DOCUMENTS

| | | | |
|---|---|---|---|
| 2004/0010791 A1* | 1/2004 | Jain .................. | G06F 9/542 719/318 |
| 2017/0118165 A1* | 4/2017 | Kumar ................ | H04L 51/36 |
| 2017/0149795 A1* | 5/2017 | Day, II ............... | H04W 12/08 |
| 2018/0114189 A1* | 4/2018 | Farah ................. | H04W 4/60 |

\* cited by examiner

*Primary Examiner* — J. Brant Murphy
(74) *Attorney, Agent, or Firm* — Finnegan, Henderson, Farabow, Garrett & Dunner LLP (57) ABSTRACT

The disclosed embodiments include systems, methods, and computer readable media configured to classify graphical user interface items according to their exposure to security sensitive operations. The techniques described in the disclosed embodiments may be used to reduce the risk of application errors by disabling graphical user interface items. Thus, the techniques may be used to minimize the risk of system crashes caused by restricting application access to a certain resource. As a result, the disclosed embodiments improve usability of application running in a restricted mode.

21 Claims, 9 Drawing Sheets

User Permissions Profile 500

Name: 502
Group: 504

| Permissions: | Tier 1<br>Basic Profile 506 | Tier 2<br>Advance Profile 508 | Custom<br>Profile 510 |
|---|---|---|---|
| Full Control | ■ | ☑ | ☐ |
| Create | ☑ | ☑ | ☑ |
| Read | ☑ | ☑ | ☐ |
| Update | ☑ | ☑ | ☐ |
| Delete | ☐ | ☑ | ☐ |
| ... | ... | ... | ... |
| File:Creation | ☑ | ☑ | ☑ |
| File:View | ☑ | ☑ | ☑ |
| File:Modify | ☑ | ☑ | ☐ |
| File:Delete | ☐ | ☑ | ☐ |
| ... | ... | ... | ... |
| Database:Entry_Creation | ☑ | ☑ | ☑ |
| Database:Entry_Read | ☑ | ☑ | ☑ |
| Database:Entry_Write | ☑ | ☑ | ☐ |
| ... | ... | ... | ... |
| Socket:Read | ☑ | ☑ | ☑ |
| Socket:Write | ☑ | ☑ | ☐ |
| ... | ... | ... | ... |

CLASSIFICATION OF GUI ITEMS ACCORDING TO EXPOSURE TO SECURITY SENSITIVE OPERATIONS

BACKGROUND

The present disclosure relates generally to computer security systems and methods and, more particularly, to computerized systems and methods for classification of graphical user interface items according to their exposure to security sensitive operations.

Today, enterprise performance management solutions enable organizations to manage user privileges (e.g., permissions) within their IT infrastructures, which may be on premises, in the cloud, or distributed as a hybrid. By managing user privileges, organizations may minimize unauthorized use of security sensitive operations and mitigate security risks associated with unlimited access to the organization's system. Modern security controls may be based on privileged accounts, user profiles, permissions, or the like, and they may ensure (or force) applications to run in a restricted mode—e.g., restricting access to specific system resources (such as data files, sockets, etc.). Such restrictions serve to mitigate against certain security risks, including unauthorized access to security sensitive operations. But these solutions may introduce additional problems: they may increase application errors caused by restricting access to certain resources and decrease usability of applications running in a restricted mode.

Accordingly, there is a need for technological solutions for improving the security of computer systems in a manner that is highly secure, robust, reliable, and user-friendly.

SUMMARY

The disclosed embodiments include systems, methods, and computer readable media configured to reduce the risk of application errors by selectively disabling application interface elements. As discussed further below, the disclosed embodiments reduce the risk of system crashes caused by restricting application access to a certain resource, and further improve the usability of applications running in a restricted mode.

In some disclosed embodiments, a system may be configured to develop a mapping associated with an application. The mapping, for example, may link a plurality of application interface elements with a plurality of hooks associated with the invocation of the plurality of application interface elements. In one aspect, these hooks are each associated with a log file. In another aspect, these hooks are each associated with security-sensitive operations. In yet another aspect, these hooks are application programming interface hooks associated with the application. In some disclosed embodiments, the mapping may be based on a classification of the plurality of application interface elements in terms of their privileged access requirements.

Some disclosed embodiments may further identify a permissions profile associated with an identity interacting with the application. For example, the permissions profile may specify rights of the identity to invoke one or more of the plurality of application interface elements. In another aspect, the permissions profile may be configurable and unique to the identity. For example, the permissions profile may be configurable and associated with a group to which the identity belongs. Based on the permissions profile, the disclosed embodiments may determine (e.g., from the plurality of application interface elements) an application interface element that the identity is not permitted to invoke. The disclosed embodiments may further disable the application interface element from being invoked by the identity through the application.

In a further aspect, some disclosed embodiments may develop the mapping through a learning process involving the invocation of the plurality of application interface elements. For example, the learning process may be an automated process. In a further aspect, some disclosed embodiments may analyze a control flow associated with the application. In a further aspect, disclosed embodiments may develop the mapping through a learning process based on static analysis of the control flow associated with the application.

In a further aspect, some disclosed embodiments may perform the disabling of the application interface element remotely from the application. The disclosed embodiments may also perform the disabling of the application interface element by sending a window message to the application. The disclosed embodiments may disable the application interface element, for example, by changing a visual appearance of the application interface element. In another aspect, the disclosed embodiments may disable the application interface element by preventing a graphical depiction of the application interface element. In yet another aspect, the disclosed embodiments may disable the application interface element by disabling a control option in a browser associated with the application.

In a further aspect, the disclosed embodiments may generate a graphical user interface associated with the application. In one aspect, the graphical user interface may include a plurality of enabled application interface elements and a plurality of disabled application interface elements.

It is to be understood that both the foregoing general description and the following detailed description are exemplary and explanatory only and are not restrictive of the disclosed embodiments as defined in the claims.

BRIEF DESCRIPTION OF DRAWINGS

The accompanying drawings are not necessarily to scale or exhaustive. Instead, emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence, nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The disclosed embodiments provide improved techniques for reducing the risk of application errors and, more particularly, systems, methods, and computer readable media to reduce the risk of application errors by disabling application interface elements. The described systems, methods, and computer readable media minimize the risk of system crashes caused by restricting application access to a certain resource, and further provide improved usability of applications running in a restricted mode.

Reference will now be made in detail to exemplary disclosed embodiments, examples of which are illustrated in the accompanying drawings and disclosed herein. Where convenient, the same reference numbers will be used throughout the drawings to refer to the same or like parts.

Figure 1:
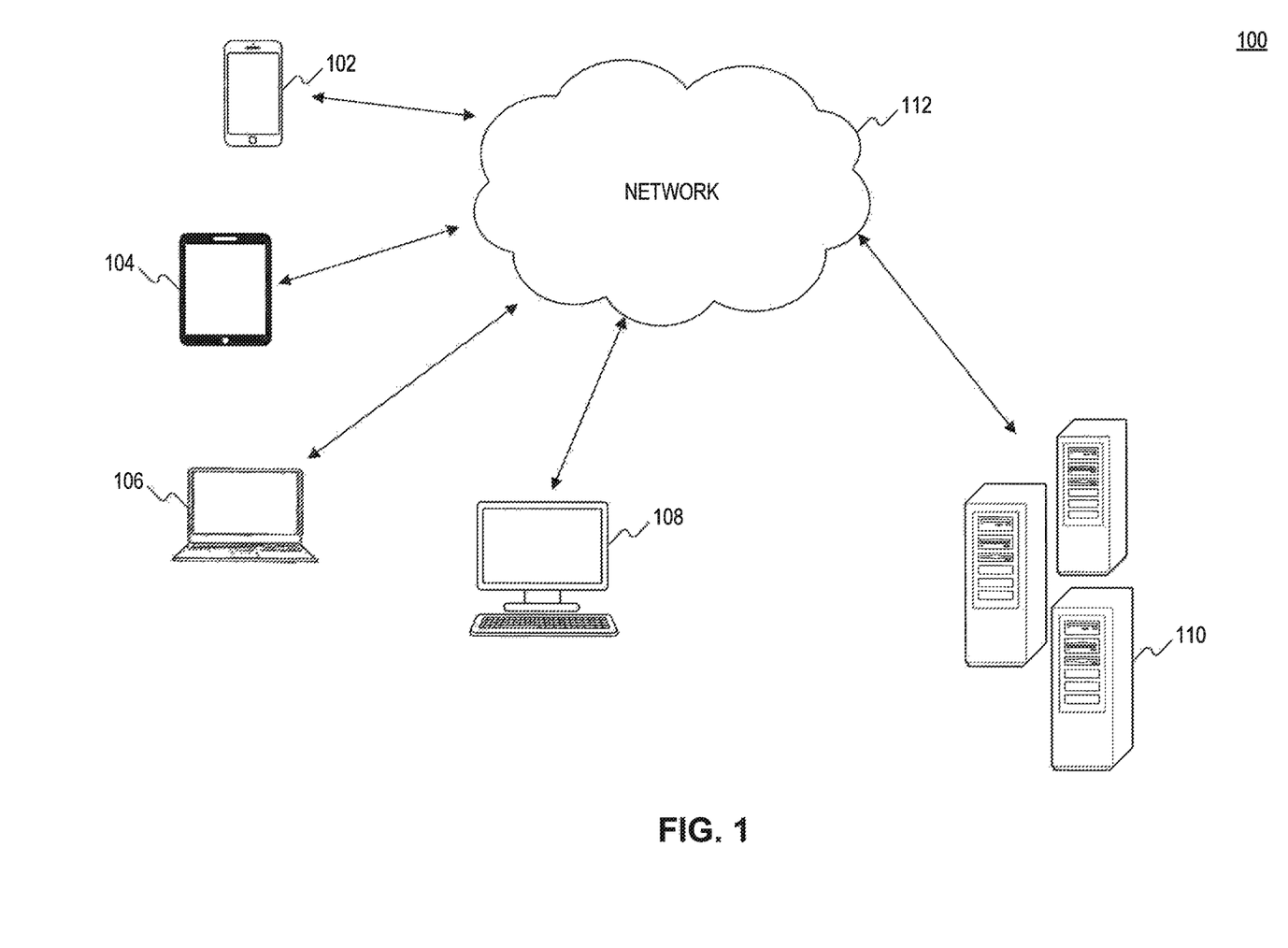
FIG. 1 is a schematic diagram of an exemplary system that may be used to reduce the risk of application errors by disabling application interface elements in accordance with disclosed embodiments.

FIG. 1 shows a diagram of an exemplary system 100 for performing one or more operations in accordance with the disclosed embodiments, as discussed further below. The system 100 may comprise various components, including one or more computing devices 102, 104, 106, 108, such as computers, web servers, general-purpose servers, authentication servers, etc. The system 100 may further include memories for storing data and/or software instructions, such as RAM, ROM, databases, or other computer memory devices, or the like.

According to some embodiments, the system 100 may include one or more mobile computing devices 102, 104, 106 of various sizes and configurations. As used herein, the terms "mobile computing device" broadly include any portable computing device having at least one processor, memory, and a capability for data communication. Mobile computing devices may include, but are not limited to, a mobile phone, smartphone, personal digital assistant, tablet, laptop, portable device, IoT device, smart appliance, home automation device, vehicle infotainment system, etc. Although the mobile computing devices 102, 104, 106 are shown as a smartphone 102, tablet 104, and laptop 106 for exemplary purposes in this description, it will be understood that other types of portable computing devices may also or alternatively be used in embodiments in accordance with this disclosure.

In some embodiments, the system 100 may also include one or more computing devices 108, 110 such as a desktop computer, workstation, server, etc. It will be apparent to those skilled in the art that the computing devices 108, 110 include at least one processor, memory for storing data and/or software instructions, and one or more user input/output devices. A server further provides functionality for other computing devices.

The mobile computing devices 102, 104, 106 and computing devices 108, 110 in the system 100 may be configured to communicate with one or more components in the system 100 via a network 112. The network 112, in some embodiments, may comprise one or more interconnected wired or wireless data networks. In one aspect, the network 112 may comprise any type of computer networking arrangement used to exchange data. For example, the network 112 may be implemented using the Internet, a wired Wide Area Network (WAN), a wired Local Area Network (LAN), a wireless WAN (e.g., WiMAX), a wireless LAN (e.g., IEEE 802.11, Bluetooth, etc.), a mobile network, a private data network, a virtual private network using a public network, and/or other suitable connection (e.g., NFC, infrared, etc.) that enables the system 100 to send and receive information between the components in the system 100. In some embodiments, the system 100 may be an enterprise computing system where one or more mobile computing devices 102, 104, 106 and computing devices 108, 110 are interconnected via the network 112. For example, the enterprise computing system may integrate a number of different applications, protocols and formats into a large-scale system.

Figure 2:
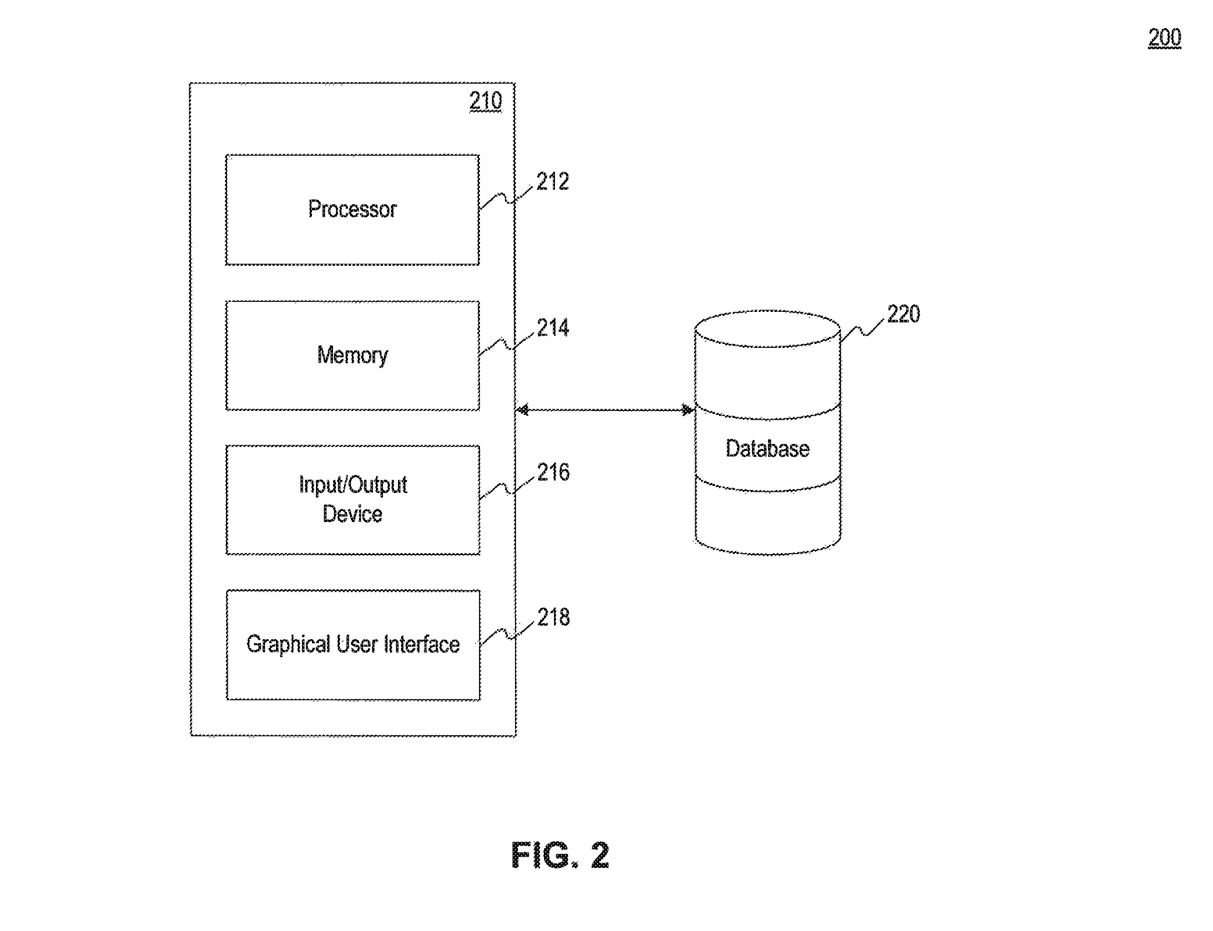
FIG. 2 is a schematic diagram of an exemplary electronic device that may be used to reduce the risk of application errors by disabling application interface elements in accordance with disclosed embodiments.

FIG. 2 shows a diagram of another exemplary system 200 for performing one or more operations in accordance with the disclosed embodiments. The exemplary system 200 or variations thereof may be implemented by one or more of the components in the system 100 (shown and not shown), including mobile computing devices 102, 104, 106 and computing devices 108, 110.

In some embodiments, the system 200 may include a computing device 210 having one or more processors 212, one or more memories 214, one or more input/output (I/O) devices 216, one or more graphical user interfaces 218, and one or more databases 220. In some embodiments, the system 200 may take the form of a mobile computing device, a personal computer, a mainframe computer, a server, or any combination of these components. Alternatively, the computing device 210 may be configured as a particular apparatus, embedded system, dedicated circuit, or the like based on the storage, execution, and/or implementation of the software instructions that perform one or more operations in accordance with the disclosed embodiments. In some embodiments, the system 200 may be a system-on-a-chip (SoC). Furthermore, the system 200 may be a stand-alone system, or it may be implemented as a subsystem in a larger system, where one or more operations in the system 200 are performed using parts of the larger system.

Processor(s) 212 may include one or more data or software processing devices. For example, the processor(s) 212 may take the form of, but not limited to, a microprocessor, embedded processor, or the like, or alternatively, the processor(s) 212 may be integrated in an SoC. Furthermore, according to some embodiments, the processor(s) 212 may be from the family of processors manufactured by Intel®, AMD®, Qualcomm®, Apple®, NVDIA®, or the like. The processor(s) 212 may also be based on the ARM architecture, a mobile processor, or a graphics processing unit, etc. The disclosed embodiments are not limited to any type of processor configured in the computing device 210.

Memory 214 may include one or more storage devices configured to store instructions used by the processor(s) 212 to perform functions related to the disclosed embodiments. For example, the memory 214 may be configured to store software instructions, such as programs, that perform one or more operations when executed by the processor(s) 212 to disable one or more application interface elements for an application running in a restricted mode. The disclosed embodiments are not limited to software programs or devices configured to perform dedicated tasks. For example, the memory 214 may include a single program, such as a user-level application, that performs the functions of the disclosed embodiments, or may comprise multiple software programs. Additionally, the processor 212 may execute one or more programs (or portions thereof) remotely located from the computing device 210. Furthermore, the memory 214 may include one or more storage devices configured to store data for use by the programs.

I/O devices 216 may include one or more integrated ports or stand-alone devices configured to allow data to be received and/or transferred by the computing device 210. In some embodiments, the I/O devices 216 may comprise a touchscreen configured to allow a user to interact with the computing device 210, and in some embodiments, the I/O devices 216 may comprise a keyboard, mouse, trackball, touch pad, stylus, and the like. The I/O devices 216 may include one or more communication devices and/or interfaces (e.g., WiFi, Bluetooth®, RFID, NFC, RF, infrared, etc.) to communicate with other machines and devices, such as the components in the system 100. I/O devices 216 may also comprise sensors, such as gyroscopes, accelerometers, thermometers, cameras, scanners, etc.

It is to be understood that the configurations and boundaries of the functional building blocks shown for exemplary systems 100 and 200 have been generally described herein for the convenience of the description. Alternative implementations may be used so long as the specified functions and relationships thereof are appropriately performed and fall within the scope and spirit of the various embodiments, as discussed further below.

Figure 3:
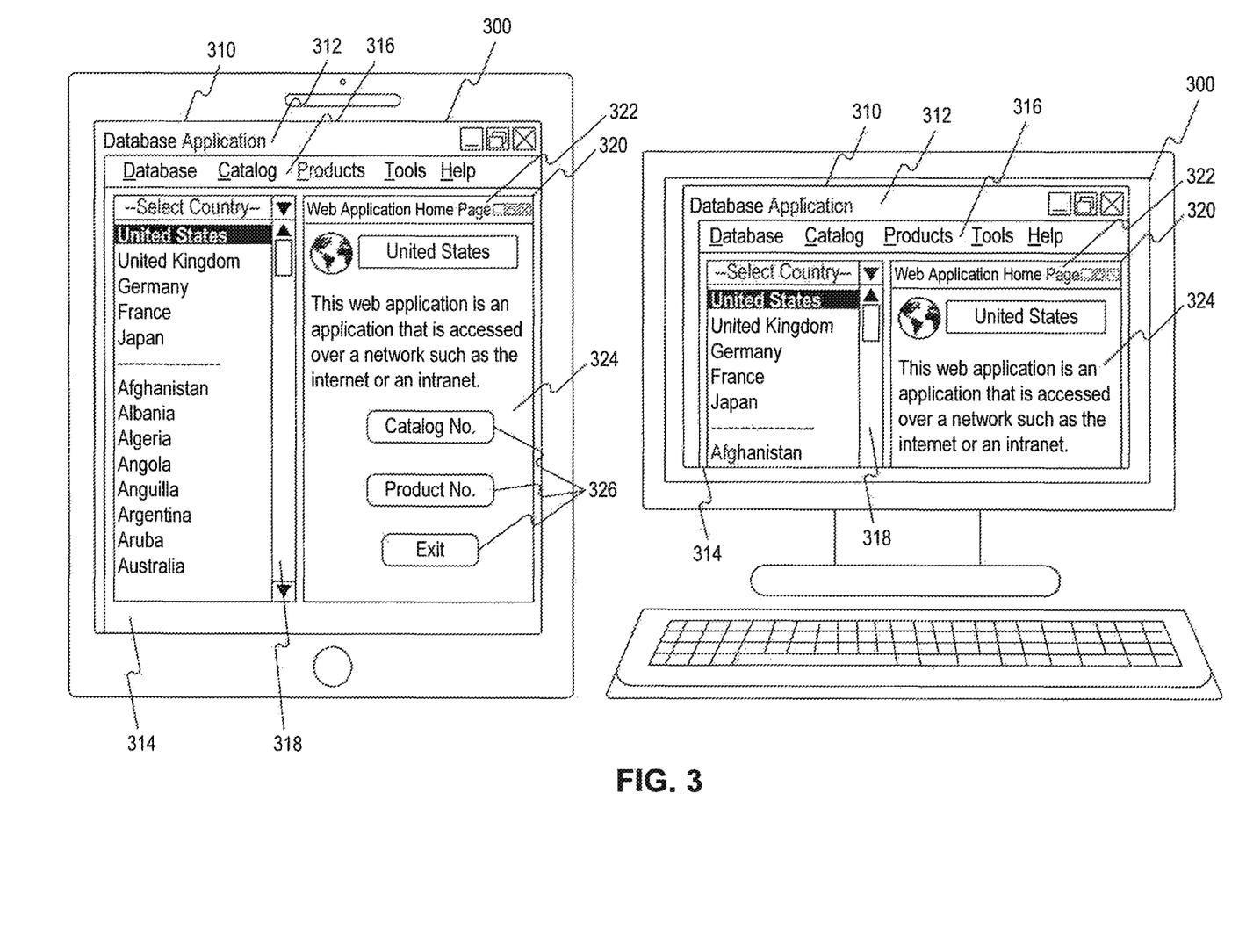
FIG. 3 is a schematic diagram of exemplary graphical user interfaces in accordance with disclosed embodiments.

FIG. 3 shows a diagram illustrating examples of a graphical user interface 300 in accordance with the disclosed embodiments. Graphical user interface 300 or variations thereof may be implemented by one or more of the components in the systems 100 and 200 (shown and not shown), including the mobile computing devices 102, 104, 106 and computing devices 108, 110 as shown in FIG. 3. As an example, FIG. 3 shows details of the screens of the mobile computing device 104 and computing device 108 in accordance with disclosed embodiments.

In general, a computing device may support a variety of software applications including web applications (e.g., Internet browsers), native applications, proprietary applications, operating systems, or the like. Web applications broadly include any software applications accessed via a web browser on a computing device, allowing the device to utilize resources available over the network. Examples include Microsoft Internet Explorer™, Netscape Navigator™, Google Chrome™, and others. Native applications broadly include various types of software applications installed as a stand-alone application on a computing device, utilizing primarily the native resources available on the computing device. In some embodiments, the software applications also may be hybrid applications, web applications with access to native resources. Proprietary applications may include custom-build or independent developed applications that are used by individuals or enterprises and are not generally available for public use. Operating systems may include Linux™, Microsoft Windows™, Apple iOS™, and various others.

As shown in FIG. 3, the computing device may support various software applications such as a native database application 310 and a web application 320. As discussed above, the native application 310 and the web application 320 may in some embodiments be hybrid applications. As illustrated in FIG. 3, the applications 310, 320 each may be associated with a respective graphical user interface comprising a plurality of application interface elements, including but not limited to: title bar 312, 322; window 314, 324; menu bar 316; scroll bar 318; control elements 326; toolbar (not shown), or the like. In general, the plurality of application interface elements provides controls that enable user interactions with the software application. In one aspect, each application interface element may be implemented as a widget or a software component that facilitates a specific user-computer interaction or operation. In another aspect, the application interface elements may be implemented as windows. In such an aspect, an application interface element may be a child window that the software application uses in connection with other windows (both parent or child) to enable a specific user-computer interaction or operation. For example, a dialog window (child window) could be called by the "File" menu bar (parent window) to receive specific commands from the user.

Regardless of how the application interface element is implemented, the user-computer interaction (or operation) may provide the user with control to access data, input data, choose certain operations or commands, and/or initiate specific actions, etc. At the user interface level, the basic, fundamental operations may comprise: CREATE, READ, UPDATE, and DELETE (referred to as CRUD). The CRUD operations enable the user, for example, to CREATE: create, insert, or add new data or files; READ: read, retrieve, search, select, or view existing data or files; UPDATE: update or modify existing data or files; and DELETE: delete, deactivate, or remove existing data or files. It is to be understood that other variations are possible and not restrictive to the exemplary CRUD operations discussed.

Figure 4A:
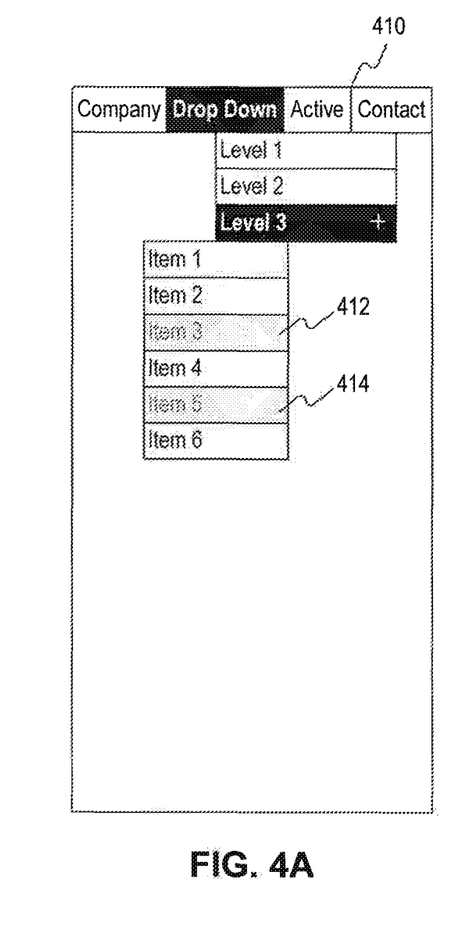
FIGS. 4A-4C are schematic diagrams of exemplary graphical user interfaces that may be used to reduce the risk of application errors by disabling application interface elements in accordance with disclosed embodiments.
Figure 4B:
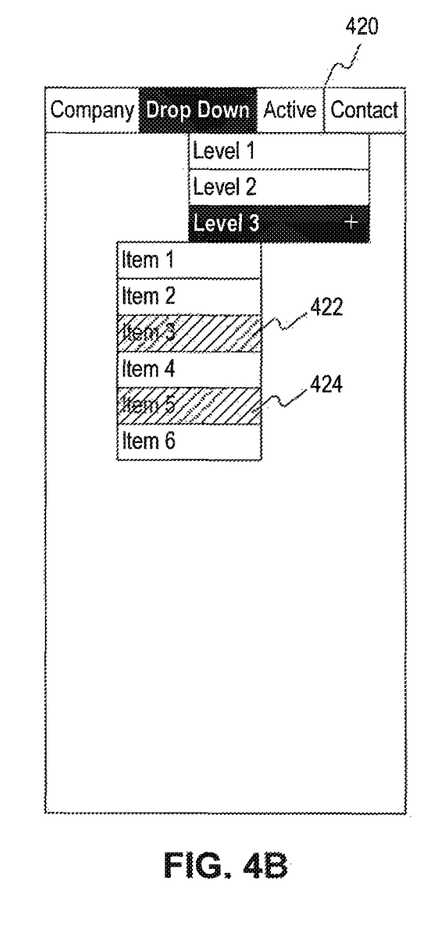
Figure 4C:
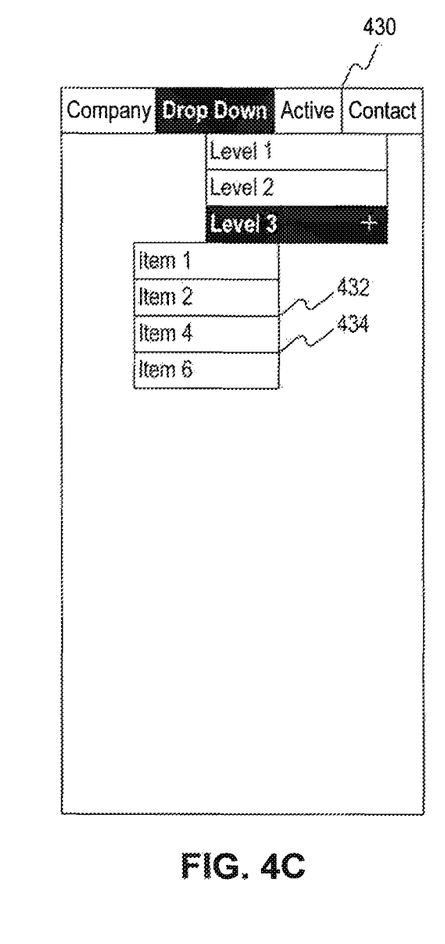

FIGS. 4A, 4B, 4C show schematic diagrams of exemplary graphical user interfaces 410, 420, 430 that may be used to reduce the risk of application errors by disabling application interface elements in accordance with disclosed embodiments. For purposes of explanation and not limitation, the following describes exemplary graphical user interfaces 410, 420, 430 or variations thereof in the context of systems 100 and 200, such that the disclosed graphical user interfaces may be implemented by software executing in mobile devices 102, 104, 106, and/or computing devices 108, 110.

Figure 5:
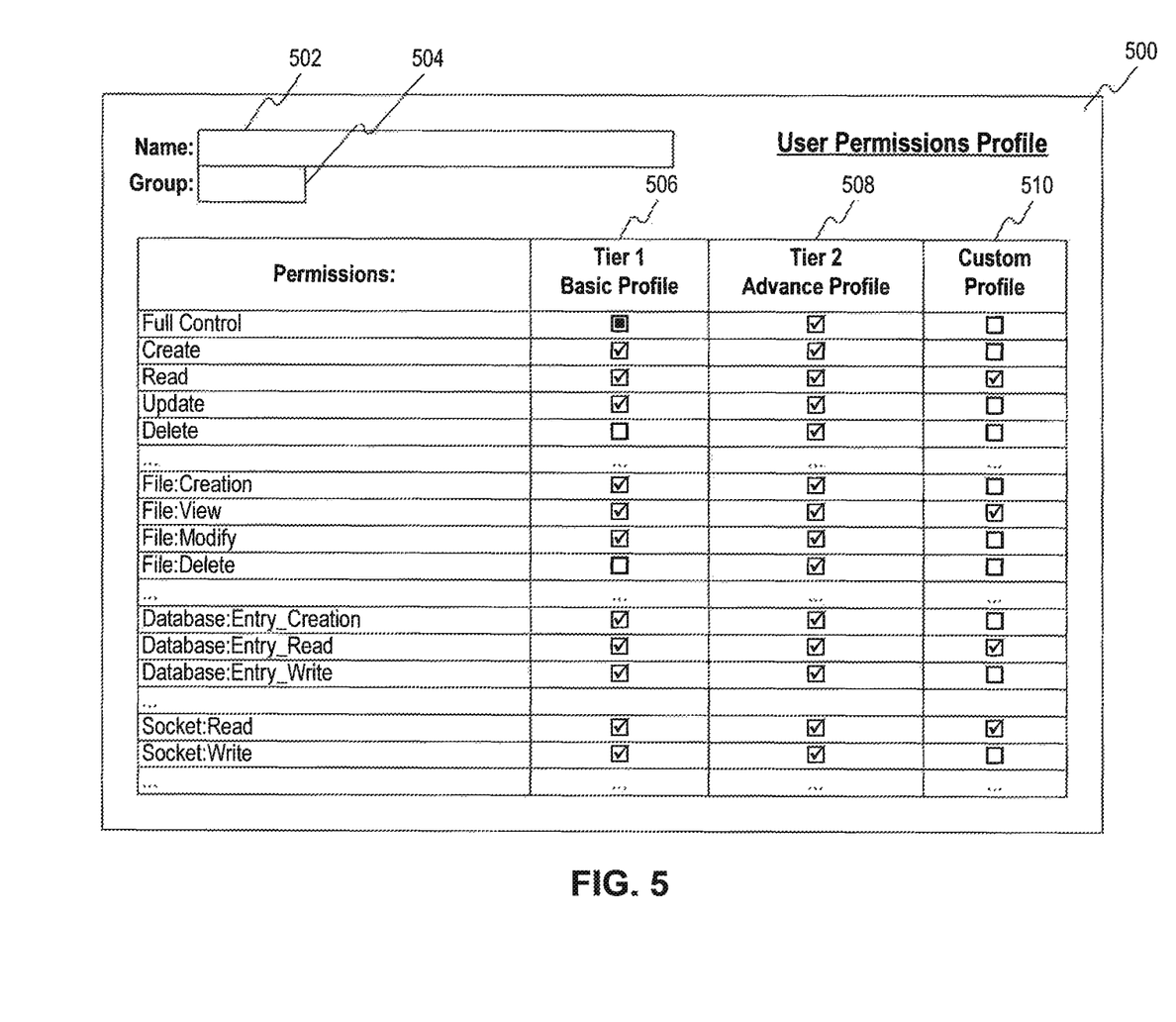
FIG. 5 is a schematic diagram of an exemplary permissions profile that may be used to reduce the risk of application errors in accordance with disclosed embodiments.

As explained with respect to FIG. 3, a graphical user interface for a software application may comprise a plurality of application interface elements, and each of the application interface elements may provide a specific operation. However, in a restricted computer environment, a user's ability to invoke a specific operation, especially a security sensitive operation, may be limited or controlled. In one aspect, the access control may be based on the particular type of operations, such as, for example, the CRUD operations. In another aspect, the access control may be based on the particular type of objects such as, for example, programs, processes, files, etc. Based on the user's permissions profile (or privilege level), the system may restrict access to a particular object and/or what operations may be performed on that given object. Additional details related to exemplary permissions profile are illustrated in FIG. 5.

Thus, depending on the access control, when an application interface element invokes a restricted operation, rather than executing the restricted operation, an error message may occur instead. The error message, for example, may be an access-denied type error message, an error message seeking to double-check that the action should be performed, etc. The reasons for the error message may be because the user does not have the appropriate permissions to perform the operation or because the user does not have the appropriate permissions to access the object, etc.

In some embodiments, the graphical user interface may be altered to disable, hide, or deactivate one or more application interface elements, as illustrated in FIGS. 4A, 4B, 4C. By disabling, hiding, or deactivating certain application interface elements, the application interface elements may be prevented from being invoked while the application is in a restricted mode. Disabling an application interface element also provides a visual indication as to what operations are available based on the privilege level.

Figure 9:
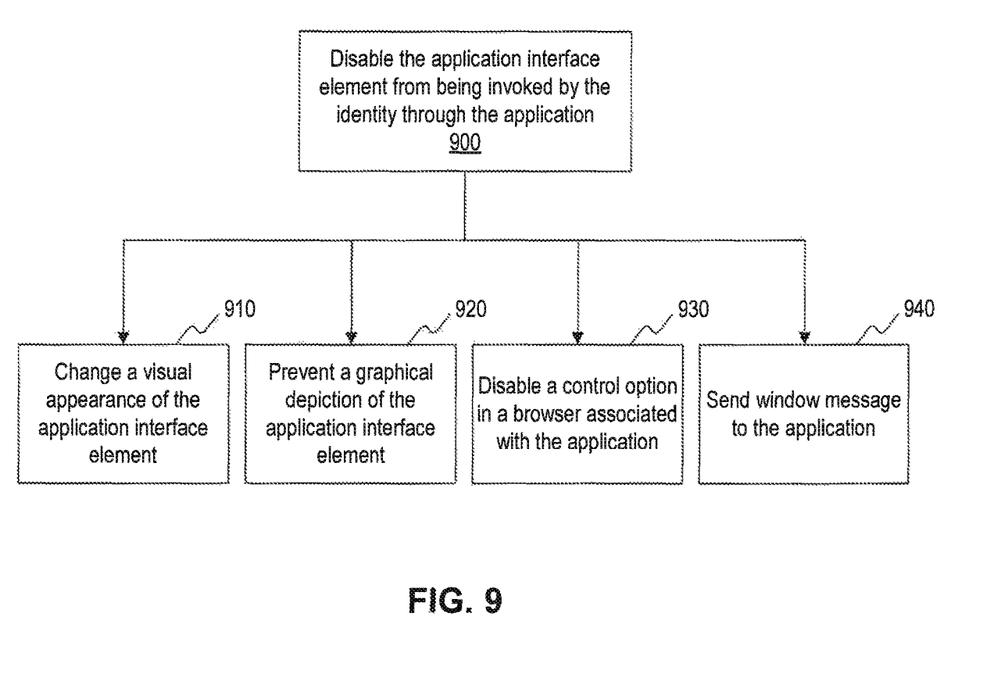
FIG. 9 is a flow chart illustrating an exemplary sequence of steps that may be used to disable an application interface element in accordance with disclosed embodiments.

In some embodiments, the disabling of an application interface element is accomplished by changing a visual appearance of the application interface element. For example, as shown in FIG. 4A, the application interface elements 412, 414 may be greyed out to indicate that the application interface elements 412, 414 have been disabled or are not selectable. Alternatively, the visualization may be blurred, faded, crossed out, etc. to change the visual appearance of the application interface elements. For example, as shown in FIG. 4B, the application interface elements 422, 424 may be crossed out to visually indicate that the specific application interface elements 422 and 424 have been disabled. In some embodiments, the visual appearance of the application interface elements may be altered as to hide the disabled elements. For example, as shown in FIG. 4C, the application interface elements 432 and 434 are hidden to hide the disabled application interface elements 432 and 434. Alternatively, in some embodiments, the graphical depiction of an application interface element may be prevented instead. (Additional details related to exemplary process for disabling application interface elements are illustrated in FIG. 9.)

FIG. 5 shows a schematic diagram of an exemplary permissions profile 500 that may be used to reduce the risk of application errors in accordance with the disclosed embodiments. For purposes of explanation and not limitation, the exemplary permissions profile 500 may be implemented in the context of systems 100 and 200, such that the disclosed permissions profile 500 may be implemented by software executing in mobile devices 102, 104, 106, and/or computing devices 108, 110.

In some embodiments, the permissions profile 500 may be associated with an identity 502 interacting with the application. In such embodiments, the permissions profile 500 may define the user permissions for a user associated with the identity 502. For example, the permissions profile 500 may specify rights of the identity 502 to invoke one or more of the plurality of application interface elements. In one aspect, the permissions profile 500 may be unique to the identity 502. Alternatively, the permissions profile 500 may be associated with a unique category or class of identities.

In some embodiments, the permission profile 500 may alternatively or in addition be associated with a group identity 504. In such embodiments, the permissions profile 500 may define the group permissions for any user belonging to the group identity 504. For example, the permissions profile 500 may specify rights of the group identity 504 to invoke one or more of the plurality of application interface elements. In one aspect, the identity 502 may be associated with the group identity 504 such that the identity 502 may belong to one or more group identity 504. In another aspect, the permissions profile 500 may be associated with a group to which the identity 502 belongs.

In some embodiments, the user permissions profile 500 provides a list of rights or permissions available to the identity 502. In one aspect, the permissions may be based on the privilege level(s) 506, 508, 510 of the identity 502. In another aspect, the privilege levels 506, 508, 510 may be based on tiered models with each tier having different permissions. In yet another aspect, each higher tier may be associated with additional permissions. For example, privilege level 506 may be a "Tier 1" profile, and as such may be a "basic" profile with certain restrictions. In such an example, the identity 502 associated with privilege level 506 may not have access to the "delete" operation, for example. Continuing with the example, privilege level 508 may be a "Tier 2" profile, and as such may be an "advance" profile with full control and no restrictions. In such an example, the identity 502 associated with privilege level 508 may have full access to all CRUD operations, for example. In another aspect, the user permissions profile 500 may be associated with a custom profile 510 unique to the identity 502. The privilege level(s) 506, 508, 510 of the identity 502 may each be a global privilege level, or they may be specific to a specific application, object type, session, etc.

In some embodiments, the user permissions profile 500 may be configurable. For example, the user permissions profile 500 may be configurable based on the object types. The user permissions profile 500 may also be configurable based on the operation types.

In some embodiments, the user permissions profile 500 may be used to reduce the risk of application errors by disabling application interface elements. The system 100, as described above, may determine the user permissions profile 500 based on the identity 502 associated with a particular user. Alternatively, the system 100 may determine the user permissions profile 500 based on the group identity 502 that a particular user belongs to. In such embodiments, the system 100 may receive the user permissions profile 500 as an input that describes what actions a particular user is authorized to perform while using the system 100.

Based on the user permissions profile 500, the system 100 may disable one or more of the plurality of application interface elements for the user. For example, if the user has "read only" access (i.e., custom profile 510), the system 100 may disable application interface elements that invoke unauthorized operations. Using a word processing application as an example, the system 100 may modify the graphical user interface for the word processing application to disable menu items the user is not authorized to use, such as create a new document, modify the existing document, or delete the existing document. In such an example, the visual appearance of the menu items may be modified to indicate that they have been disabled. Alternatively, the disabled menu items may be prevented from being graphically depicted. Similarly, in a database application, the application interface elements for creating a new database entry, modify the existing database entry, etc. may be disabled based on the user permissions profile 500.

In some embodiments, the user permissions profile 500 may reduce the system's exposure to security sensitive operations. The user permissions profile 500 may further reduce the risk of application errors caused by restricting application access to resources and improve usability of applications running in a restricted mode.

Figure 6A:
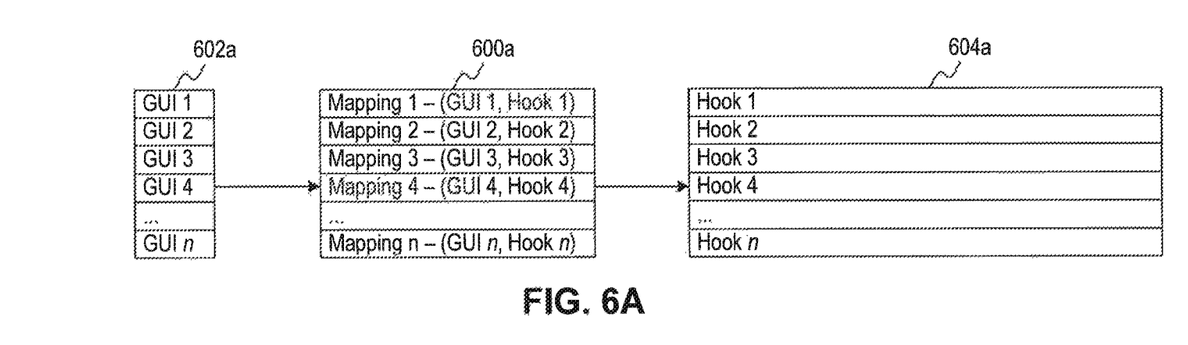
FIGS. 6A-6C are schematic diagrams of exemplary mappings that may be used to reduce the risk of application errors by disabling application interface elements in accordance with disclosed embodiments.
Figure 6B:
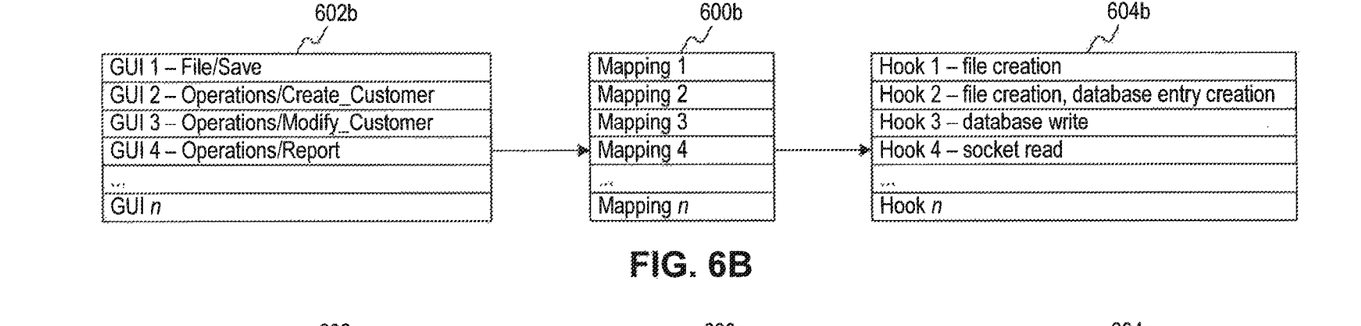
Figure 6C:
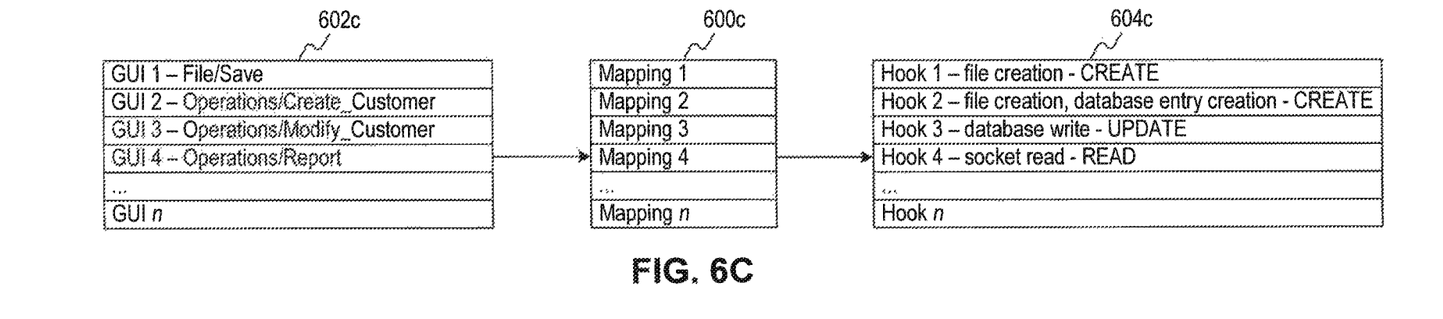

FIGS. 6A, 6B, 6C show schematic diagrams of exemplary maps 600a, 600b, 600c that may be used to reduce the risk of application errors by disabling application interface elements in accordance with the disclosed embodiments. For purposes of explanation and not limitation, the following describes exemplary maps 600a, 600b, 600c in the context of systems 100 and 200, such that the disclosed maps may be implemented by software executing in mobile devices 102, 104, 106, and/or computing devices 108, 110.

A map is a data structure that maps or binds a first set of one or more elements to a second set of one or more elements. As shown in FIG. 6A, map 600a binds a plurality of application interface elements ($GUI_1$-$GUI_n$) 602a to a plurality of hooks ($Hook_1$-$Hook_n$) 604b. The hooks, for example, may be application programming interface hooks. In some embodiments, the map may be implemented as an application metadata. In some embodiments, the map may be implemented as an array (vector or arraylist), linked-list, binary search tree, harsh table, etc. But in general, the map stores data in key-value (k, v) pairs such that every key would be mapped to a value. In the example in FIG. 6A, the key-value pairs may be ($GUI_n$, $Hook_n$) pairs.

FIG. 6B shows an exemplary map 600b for a database application. For example, map 600b comprises a plurality of mappings 1 to n that binds a plurality of application interface elements ($GUI_1$-$GUI_n$) 602b to a plurality of hooks ($Hook_1$-$Hook_n$) 604b. In such an example, each of the mappings binds a respective application interface element to its respective hook. In some embodiments, each of the application interface elements ($GUI_1$-$GUI_n$) may contain a path describing where the respective interface element is located. For example, $GUI_1$ may contain the path "File/Save": where "File" is a first application interface element that invokes a menu that contains "Save" as a second application interface element within that menu. In another word, the path "Operations/Create_Customer" for $GUI_2$ means that "Create_Customer" is a child application interface element of the parent "Operations" application interface element.

Each of the plurality of application interface elements may invoke a specific operation, which may be classified as a hook. For example, the "File/Save" item may be classified as a "file creation" hook, the "Operations/Create_Customer" item may be classified as a "file creation" and/or "database entry creation" hook, the "Operations/Modify_Customer" item may be classified as a "database write" hook, and the "Operations/Report" item may be classified as a "socket read" hook, etc. In such a way, the plurality of application interface elements may be linked with a plurality of hooks associated with invocation of the application interface elements.

In some embodiments, the classification may be based on the CRUD operations, as shown in FIG. 6C. In FIG. 6C, map 600c comprises a plurality of mappings 1 to n that binds a plurality of application interface elements ($GUI_1$-$GUI_n$) 602c to a plurality of hooks ($Hook_1$-$Hook_n$) 604c. In this example, the classification of the "File/Save" item may be further classified as a CREATE hook, the "Operations/Create_Customer" item may be further classified as a CREATE hook, the "Operations/Modify_Customer" item may be further classified as a UPDATE hook, and the "Operations/Report" item may be classified as a READ hook, etc.

Figure 7:
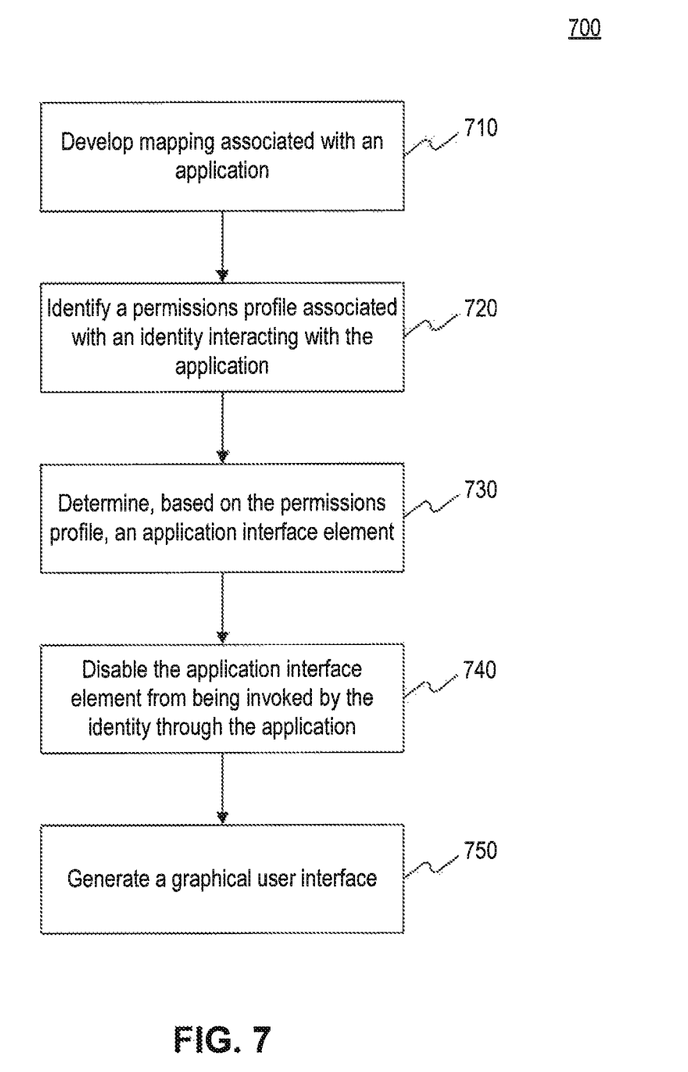
FIG. 7 is a flow chart illustrating an exemplary sequence of steps that may be used to reduce the risk of application errors by disabling application interface elements in accordance with disclosed embodiments.

FIG. 7 shows a flow chart illustrating an exemplary process 700 that may be used to reduce the risk of application errors by disabling application interface elements in accordance with the disclosed embodiments. The process of FIG. 7 may be implemented in software, hardware, or any combination thereof. For purposes of explanation and not limitation, the process 700 will be described in the context in the context of system 100, such that the disclosed process may be performed by software executing in mobile devices 102, 104, 106, and/or computing devices 108, 110.

In the aspect of reducing the risk of application errors, the system 100 may be configured to disable application interface elements associated with an application. For example, at step 710, the system 100 may develop a mapping associated with the application. In one aspect, developing a mapping involves creating a metadata file associated with the application. For example, the system 100 may invoke each of the plurality of application interface elements to determine which one of the hooks is triggered. Thus, the application metadata file may contain a mapping with the description of all of the application interface elements associated with the application and the hooks that are being triggered when the application interface elements are invoked. In other words, the mapping may link a plurality of application interface elements with a plurality of hooks.

In some embodiments, a subset of the application interface elements may be associated with security sensitive operations. In one aspect, security sensitive operations may be certain operations on restricted resources. For example, a CRUD operation on resources such as passwords, encrypted files, or the like may be security sensitive operations due to the sensitive nature of the resources operated upon. In another aspect, security sensitive operations may be operations that require certain privileges. In the foregoing example, the CRUD operation on resources such as passwords, encrypted files, or the like may be security sensitive operations because these operations require certain minimum privilege levels typically associated with administrative roles or persons having administrative access.

At step 720, the system 100 may identify a permissions profile associated with an identity interacting with the application. For example, the system 100 may maintain a permissions profile for each user who have access to one or more components of the system 100. These permissions profiles may be stored in a storage repository, such as a database, that may be maintained on premise, in the cloud, or distributed in between. In one aspect, the permissions profile may be maintained based on an identity unique to the user. In another aspect, the permissions profile may be maintained based on a group identity indicating the group the user belongs to. In some embodiments, the permissions profile may be a set of policies that describes what a particular user or group is authorized to do in the system 100. In some embodiments, the permissions profile may be a list of rights, or the like.

To identity the identity interacting with the application, the system 100 may perform a user authentication process. The authentication process may involve one or more authentication factors, including but not limited to a user's knowledge factors (user identity, password, pin, secret answers, etc.), possession factors (tokens, one-time passcode, key fobs, key cards, smartphone, etc.), biometrics factors (fingerprint, facial recognition, retina scans, etc.), location factors (physical presence versus remote access, etc.), and the like. Once the system 100 has authenticated the user's identity, it may identify a permissions profile based on the user's identity. In another aspect, the system 100 may identify the permissions profile based on the user group that the user belongs to, and in such an aspect, the permissions profile may describe the privilege level or permissions rights of the group. In yet another aspect, the system 100 may use an external process to identity the permissions profile.

Because the permissions profile specifies the rights of the user to invoke one or more of the plurality of application interface elements associated with the application, at step 730, the system 100 may determine, based on the permissions profile, an application interface element that the user is not permitted to invoke. In some embodiments, the system 100 may determine one or more application interface elements that the user is not permitted to invoke. And conversely, in some embodiments, the system 100 may determine one or more application interface elements that the user is permitted to invoke.

In some embodiments, the system 100 may compare the application metadata with the permissions profile to determine which one of application interface elements the user is not permitted to invoke based on the user's permissions profile. By comparing the application metadata with the permissions profile, the system 100 may classify all application interface elements with respect to the privileges the elements require. For example, the system 100 may classify an application interface element as a "disabled" application interface element, or alternatively, the system 100 may classify an application interface element as an "enabled" application interface element.

At step 740, the system 100 may disable the application interface element from being invoked by the identity. By disabling the application interface element, the user is prevented from invoking certain security sensitive operation that the user is otherwise unauthorized to access.

In some embodiments, the system 100 may, at step 750, generate a graphical user interface. For example, in some embodiments, the system 100 may generate a graphical user interface that includes a plurality of enabled application interface elements and a plurality of disabled application interface elements. In some other embodiments, the system 100 may generate only the plurality of enabled application interface elements. In such embodiments, the disabled application interface elements may be hidden and/or invisible to the user.

Figure 8:
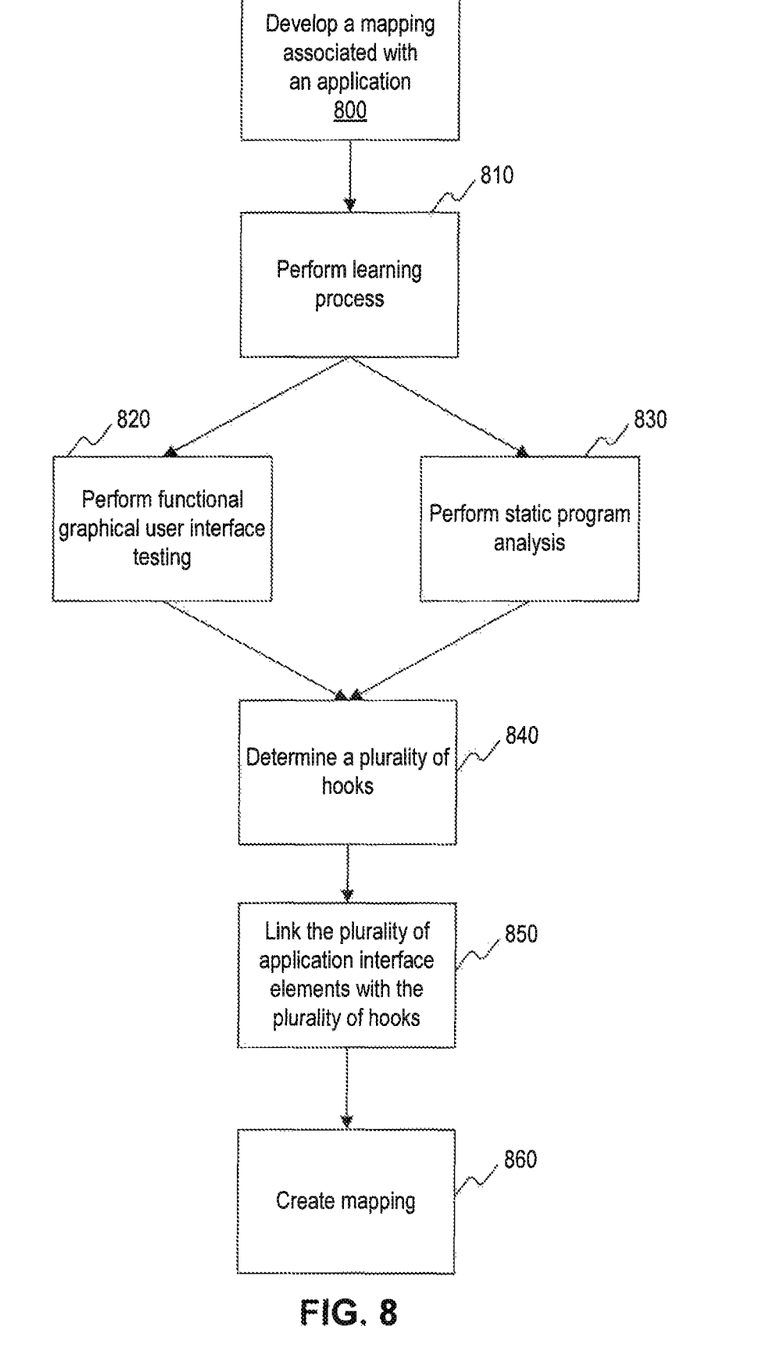
FIG. 8 is a flow chart illustrating an exemplary sequence of steps that may be used to develop a mapping associated with an application in accordance with disclosed embodiments.

FIG. 8 is a flow chart illustrating an exemplary process 800 that may be used to develop a mapping associated with an application in accordance with the disclosed embodiments. The process of FIG. 8 may be implemented in software, hardware, or any combination thereof. For purposes of explanation and not limitation, the following describes exemplary process in the context of systems 100 and 200, such that the disclosed process 800 may be performed by software executing in mobile devices 102, 104, 106, and/or computing devices 108, 110.

In process 800, a mapping associated with an application is developed. During the mapping process, the system 100 analyzes the control flow of the application to determine what downstream operations are invoked by the plurality of application interface elements. For example, a certain menu item may attempt to open a socket, read a file, write to a file, delete a file, etc. In other words, by performing the control flow analysis, the system 100 may discover the security sensitive operations which are invoked when a certain menu item is invoked. Because the system 100 has access to the permissions profile of a user, the system 100 may move the flow interception point as far upstream as possible from the computer-operation level (i.e., the security sensitive operations) to the user-interface level (i.e., the application interface elements).

Moving the interception point to the user-interface level has several advantages. This may allow the system 100 to disable portions of a graphical user interface rather than preventing the underlying security sensitive operations. The system 100 may avoid having to disrupt a control flow of the application. And the usability of the application may be improved because the system 100 may avoid unnecessary application errors due to the lack of permissions.

At step 810, the system 100 may perform a learning process to analyze the control flow of the application. In some embodiments, the learning process 810 may involve configuring the system 100 as a hardened environment. Hardening secures the system 100 to reduce or limit access to certain resources. For example, during the hardening process, the system may set up access control to its resources. In some embodiments, the system 100 may install application programming interface hooks that are relevant to various security sensitive operations. It is understood that the process of hooking enables the system 100 to either alter or augment the behavior of the operating system, applications, software components, or the like. For example, the hooks may intercept function calls, messages, events, etc. passed among the operating system, applications, software components, or the like. In some embodiments, the hooks are each associated with a log file.

In some embodiments, at step 820, the system 100 may perform functional graphical-user-interface testing. Functional graphical-user-interface testing enables the system 100 to navigate through the graphical user interface and invoke the plurality of application interface elements. In other words, the testing invokes each application interface element to determine which hooks are triggered. In some embodiments, the testing may involve invoking the application interface elements in multiple iterations. In some embodiments, the testing may be performed automatically. For example, the testing may be performed by an application instance or service that performs graphical-user-interface testing. In some embodiments, the testing may be performed using a test script.

In some embodiments, at step 820, the system 100 may perform static program analysis (or static code analysis). Static program analysis enables the system 100 to analyze the software without executing the application. In one aspect, static program analysis enables the system 100 to analyze the application's control flow. As a result, the system 100 can determine the function calls, messages, events, or the like that are invoked by the application interface elements by tracing through the static programming.

It is to be understood that steps 820 and 830 may occur independently, concurrently, or concomitantly. In other words, neither of steps 820 and 830 are dependent on each other occurring before the other step can occur.

At step 840, the system 100 may determine a plurality of hooks based on the results from steps 820 and/or 830. At step 850, the system 100 may link the plurality of application interface elements with the plurality of hooks.

At step 860, the system 100 may create a mapping of the plurality of application interface elements with the plurality of hooks. In one aspect, the mapping may be a metadata file associated with the application. In another aspect, the mapping may be stored in a map data structure.

FIG. 9 is a flow chart illustrating an exemplary process 900 that may be used to disable the application interface element in accordance with the disclosed embodiments. The process of FIG. 9 may be implemented in software, hardware, or any combination thereof. For purposes of explanation and not limitation, the following describes exemplary process in the context of systems 100 and 200, such that the disclosed process 900 may be performed by software executing in mobile devices 102, 104, 106, and/or computing devices 108, 110.

In process 900, the application interface element is disabled. Example processes to disable the application interface element include, by way of example and not limitation: changing a visual appearance of the application interface element in process 910, preventing a graphical depiction of the application interface element in process 920, disabling a control option in a browser associated with the application in 930, and/or sending window message to the application in process 940. It is to be understood that any number of the above processes may be applied in any order and that additional process that can be used may not be illustrated in the example above.

In some embodiments, the system 100 may change a visual appearance of the application interface element that has been disabled, at step 910. For example, the visual appearance of the application interface element may be shaded, blurred, faded, greyed out, crossed out, made invisible etc. to indicate that the application interface element has been disabled, rendered inoperative, made inaccessible, etc. In some embodiments where the user privilege level is based on a freemium, premium, or subscription model, such visual indication may provide incentives for the user to upgrade the privilege level. However, in some embodiments, the system 100 may prevent a graphical depiction of the application interface element that has been disabled, at step 920. For example, when a user has very limited access to system resources and/or operations, it may be better to hide the application interface element (i.e., provide less functionality to the user).

In some embodiments, the system 100 may disable a control option in an application, at step 930. Although the foregoing discussion primarily addresses the context of a user accessing security sensitive operations, the system 100 must also protect resources and security sensitive operations from unauthorized access from outside the system. For example, many of the security risks, such as trojans, malwares, ransomwares, or the like, hijack a system by changing certain settings in the operating systems, applications, etc. Ransomwares, for example, may encrypt the resources and thus prevent the system from accessing them. Malwares, for example, may change a proxy setting in a web browser to redirect all traffic through the malware's server or website. At step 930, the system 100 may disable certain control options to further safeguard the system. For example, the system 100 may disable the encryption ability when the user does not have access to that permission. In another example, the system 100 may disable control options in a browser to prevent unauthorized changes to the application.

In some embodiments, the system 100 may disable the application interface element by an external process, at step 940. For example, in a Windows™ or Apple iOS™ system, application interface elements may be disabled by sending window messages to the application's window controls. In such a system, each application interface element may be a window, which is controlled by the application's window controls. For example, when a change is made to a specific application interface element, the system 100 may send a message to the element's window controls to affect the specific change.

For example, if the user has "read only" access (i.e., custom profile 510), the system 100 may disable application interface elements that would otherwise invoke unauthorized operations. Using a word processing application as an example, the system 100 may modify the graphical user interface for the word processing application to disable menu items the user is not authorized to do, such as create a new document, modify the existing document, or delete the existing document. In such an example, the visual appearance of the menu items may be modified to indicate that they have been disabled. Alternatively, the disabled menu items may be prevented from being graphically depicted. Similarly, in a database application, the application interface elements for creating a new database entry, modify the existing database entry, etc., may be disabled based on the user permissions profile 500.

To further illustrate various of the example embodiments, the exemplary process 700 will now be described in the context of an exemplary use case of a database application 310 running in system 100. The following example should not be construed as limiting and/or exhaustive, but rather, as an illustrative use case to show an implementation of at least one of the disclosed embodiments for classification of the graphical user interface items according to exposure to security sensitive operations.

Database application 310 may enable users of system 100 to enter and retrieve information from one or more databases 220, such as human resources databases, accounting databases, engineering databases, etc. Modern database applications may allow concurrent updates and queries from multiple users, applications, or other types of identities. Because the identities may have different privilege levels, the system 100, in the disclosed embodiments, may alter the graphical user interface of the database application 310 based on the identities' privilege levels. To achieve this, the system 100 may classify the graphical user interface items based on their exposure to security sensitive operations.

For illustrative purposes, database privileges may include the right to perform a particular operation on database objects (e.g., databases, tables, procedures, views, etc.), including but not limited to: CONNECT, CREATE, INSERT, SELECT, UPDATE, DELETE, or other operations (including socket operations). The identity's privilege level may be granted explicitly or based on the identity's role. For example, the identity Limited_User may be granted the privileges to connect to a database and to select records in tables, but the identity Advanced_User may be granted the additional privileges to create a database and/or table, and insert, update, and/or delete records in the table, etc. The identity's privilege level may also be set based on the identity's role. For example, should the identity create a database, the identity may be assigned an administrative (or owner) role, which may have a set of predetermined privileges associated with the specific role. As explained with respect to FIG. 5, the identity's privileges may be defined in a permissions profile 500.

In the disclosed embodiments, the system 100 may develop a mapping associated with the database application 310 to map the database application's graphical user interface items (i.e., application interface elements) to a set of a set of application programing interface hooks, at step 710. For example, the system 100 may iteratively invoke each of the database application's graphical user interface items to determine which one of the application programing interface hooks is triggered by the graphical user interface. The system 100 may store the mapping as a metadata file associated with the database application 310.

Depending on the specific identity seeking to operate the database application 310, the system 100 may identify a permissions profile associated with the specific identity. For example, when Limited_User may seek to initiate a new session, the system 100 may identify a permissions profile that is associated with Limited_User's identity. Once the system 100 retrieves Limited_User's permissions profile, at step 730, the system 100 may determine one or more graphical user interface items that would trigger operations outside of Limited_User's privilege level (i.e., expose the user to security sensitive operations). For example, the system 100 may compare the metadata file of the database application 310 to Limited_User's permissions profile to determine which one of the graphical user interface items would trigger unpermitted operations.

At step 740, the system 100 may disable the one or more graphical user interface items from the database application 310 to prevent Limited_User from invoking the disabled graphical user interface items. In the disclosed embodiments, the system 100 may also generate a modified graphical user interface, at step 750, to visually indicate to Limited_User of the permissible and/or impermissible operations.

Using the exemplary process 700, the system 100 may provide a unique graphical user interface for each of the users of the system 100 and for each of the applications in the system 100. Exemplary process 700 may also ensure that the user interface and user experience are tailored to the identity and/or application, and further prevent application errors in managed applications or hardened systems.

To further illustrate the example embodiments, the exemplary process 800 will now be described in the context of an exemplary use case of a database application 310 running in system 100. The following example should not be construed as limiting and/or exhaustive, but rather, as an illustrative use case to show an implementation of at least one of the disclosed embodiments for classification of the graphical user interface items according to exposure to security sensitive operations.

When the system 100 develops a mapping associated with the database application 310 to map the database application's graphical user interface items (i.e., application interface elements), the system 100 may perform a learning process, at step 810. The learning process may enable the system 100 to determine which one of the database operations is triggered by a graphical user interface item of the database application 310. For illustrative purposes, the database application 310 may have the following exemplary graphical user interface items: "File/Open," "Operations/Create Customer," "Operations/Modify Customer," "Operations/Report," etc.

The system 100 may perform several different methods to learn control flow of the database application 310. In some embodiments, the system 100 may perform functional graphical user interface testing, at step 820. For example, the system 100 may iteratively invoke each of the exemplary graphical user interface items to determine which one of the database operations is triggered by the graphical user interface items. Using the exemplary list of graphical user interface items as an example, the "File/Open" item may trigger the CONNECT operation to access an existing database; the "Operations/Create Customer" item may trigger the INSERT operation to add a new row or column to an existing database table; the "Operations/Modify Customer" item may trigger the UPDATE operation to modify an existing row or column in a database table; and the "Operations/Report" item may trigger a socket operation, etc.

In some embodiments, the system 100 may perform a static program analysis, at step 830. In a static program analysis, the system 100 may analyze the database application 310 without executing the application. For example, the system 100 may analyze the source code, the object code, etc., to understand the control flow of the database application 310. Using the static program analysis, the system 100 may similarly determine which one of the database operations is triggered by the graphical user interface items.

At step 840, the system 100 determines a plurality of hooks that is triggered by the graphical user interface items. The plurality of hooks classifies the graphical user interface items based on their exposure to security sensitive operations. In some embodiments, the hooks may be associated with the database operations triggered by the graphical user interface items. In some embodiments, the hooks may be associated with higher-level operations, such as the CRUD operations, or other globally applicable operations.

At step 850, the system 100 may link the plurality of graphical user interface items of the database application 310 with the plurality of hooks. In some embodiments, the links may be stored in as a metadata file to the database application 310, at step 860. Other forms of mapping data structure may also be used by the system 100 to create a mapping of the plurality of graphic user interface items of the database application 310 with the plurality of hooks, at step 860. The mapping for the database application 310 may enable the system 100 to provide a unique graphical user interface for each of the users of the system 100.

In sum, exemplary process 800 may provide an unique user interface and/or user experience for the applications in the system 100, and further prevent application errors in managed applications or hardened systems.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not tp be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A computer-implemented method for reducing a risk of application errors by disabling application interface elements, the method comprising:
    developing a mapping associated with an application, the mapping linking a plurality of application interface elements with a plurality of hooks associated with invocation of the plurality of application interface elements;
    identifying a permissions profile associated with an identity interacting with the application, the permissions profile specifying rights of the identity to invoke one or more of the plurality of application interface elements;
    determining, based on the permissions profile, an application interface element from the plurality of application interface elements that the identity is not permitted to invoke; and
    disabling the application interface element from being invoked by the identity through the application, wherein the disabling of the application interface element includes at least one of: changing a visual appearance of the application interface element, or preventing a graphical depiction of the application interface element.

2. The computer-implemented method of claim 1, wherein the permissions profile is configurable and unique to the identity.

3. The computer-implemented method of claim 1, wherein the permissions profile is configurable and associated with a group to which the identity belongs.

4. The computer-implemented method of claim 1, further comprising generating a graphical user interface associated with the application, the graphical user interface including a plurality of enabled application interface elements and a plurality of disabled application interface elements.

5. The computer-implemented method of claim 1, wherein the mapping is based on a classification of the plurality of application interface elements in terms of their privileged access requirements.

6. The computer-implemented method of claim 1, wherein the mapping is developed through a learning process involving the invocation of the plurality of application interface elements.

7. The computer-implemented method of claim 6, wherein the learning process is automated.

8. The computer-implemented method of claim 6, wherein the learning process is based on static analysis of a control flow associated with the application.

9. The computer-implemented method of claim 1, wherein the disabling of the application interface element is performed remotely from the application.

10. The computer-implemented method of claim 1, wherein the disabling of the application interface element is performed by sending a window message to the application.

11. The computer-implemented method of claim 1, wherein the disabling of the application interface element includes disabling a control option in a browser associated with the application.

12. A non-transitory computer readable medium including instructions that, when executed by at least one processor, cause the at least one processor to perform operations for reducing a risk of application errors by disabling application interface elements, the operations comprising:
    developing a mapping associated with an application, the mapping linking a plurality of application interface elements with a plurality of hooks associated with invocation of the plurality of application interface elements;
    identifying a permissions profile associated with an identity interacting with the application, the permissions profile specifying rights of the identity to invoke one or more of the plurality of application interface elements;
    determining, based on the permissions profile, an application interface element from the plurality of application interface elements that the identity is not permitted to invoke; and
    disabling the application interface element from being invoked by the identity through the application, wherein the disabling of the application interface element includes at least one of: changing a visual appearance of the application interface element, or preventing a graphical depiction of the application interface element.

13. The non-transitory computer readable medium of claim 12, wherein the plurality of hooks are each associated with a log file.

14. The non-transitory computer readable medium of claim 12, wherein the plurality of hooks are each associated with security-sensitive operations.

15. The non-transitory computer readable medium of claim 12, wherein the mapping is developed through a learning process involving the invocation of the plurality of application interface elements.

16. The non-transitory computer readable medium of claim 15, wherein the learning process is automated.

17. The non-transitory computer readable medium of claim 15, wherein the learning process is based on static analysis of a control flow associated with the application.

18. The non-transitory computer readable medium of claim 12, where the plurality of hooks are application programming interface hooks associated with the application.

19. The non-transitory computer readable medium of claim 12, wherein the disabling of the application interface element is performed remotely from the application.

20. The non-transitory computer readable medium of claim 12, wherein the disabling of the application interface element is performed by sending a window message to the application.

21. The non-transitory computer readable medium of claim 12, wherein the disabling of the application interface element includes disabling a control option in a browser associated with the application.

* * * * *